3,567,570
GLASS FIBERS HAVING REDUCED STATIC ELECTRICITY GENERATING PROPERTIES

Jerome A. Preston, Granville, Michael J. Harvey, Newark, and Leo P. Caron, Reynoldsburg, Ohio, and Carl C. Rue, Anderson, S.C., assignors to Owens-Corning Fiberglas Corporation
No Drawing. Filed Aug. 14, 1967, Ser. No. 660,230
Int. Cl. B32b *17/04;* C03c *25/02*
U.S. Cl. 161—193          6 Claims

ABSTRACT OF THE DISCLOSURE

A polyester panel reinforced with chopped glass fibers coated with a mixture of particles of a non-ionic organosiloxane, a compatible film forming resin, and a coupling agent from the group of metal oxides, Werner complexes, and organosilanes.

BACKGROUND OF THE INVENTION

The mutual abrasion of glass fibers greatly reduces their effective strength. Glass fibers, therefore, are coated with a lubricant immediately after being formed, and this lubricant serves the function of maintaining separation of the fibers and preventing scratching thereof as the fibers are drawn over guide surfaces and the like. These lubricant coatings include film formers which usually are some type of organic polymer. Organic polymers have the property of generating static electricity when they are rubbed against other surfaces, and this static electricity produces a separation or "fluffing" of the monofilaments forming the strand. The "fluffing" of the filaments not only subjects them to damage, but creates many problems during subsequent beaming, weaving, chopping, and other mechanical processes which the fibers must undergo prior to their ultimate use as a fabric or as a reinforcing for plastics. During the chopping of the fibers to produce short lengths for the reinforcing of plastics, an electrostatic charge on the short lengths of fibers causes a collection of the charged fibers on surrounding surfaces, and an inherent loss of the fibers occurs during the transfer from the chopping operation to the resin matrix.

The amount of static electricity which is generated on the resin coated glass fibers is inversely proportional to the humidity of the air. It is not possible in all instances to control the humidity in the areas where the fibers are chopped and are incorporated with the resin; and in some operations, as for example in the making of glass fiber reinforced polyester resin panels, the distribution of the fibers on dry days can be so poor as to cause a sufficiently high percentage of nonuniformly reinforced product as to require a shutdown of the panel making operation.

It has been known heretofore that ionic materials can be added to the resin mixture that is applied to the fibers to cut down the amount of static electricity which is generated on the fibers. Generally, it has been found, however, that ionic materials interfere with the bond that is produced between the resin coating and the glass fibers, and in some instances will also decrease the strength of the resin composition and/or affect its appearance. Still other difficulties are created by the addition of the ionic materials sometimes called "antistatic agents," so that in many instances these materials cannot be used; and in substantially all instances, there is a reduction in the physical and other properties of the product.

An object of the invention, therefore, is the provision of a new and improved coating material for glass fibers.

SUMMARY OF THE INVENTION

It is known that glass immediately upon cooling from a molten condition is slightly positively charged. It is also known that glass quickly picks up moisture from the air and that the hydroxyl ions so absorbed by the glass causes the surface of the glass to take on a negative charge. It is further known that when a glass surface is rubbed with an organic polymer, such as silk or synthetic hydrocarbon resin, the hydrocarbon resin becomes negatively charged and the glass surface becomes positively charged. It is postulated that friction between the polymer and glass surface removes some of the hydroxyl ions to create an electrostatic unbalance.

The organosiloxane must be substantially free of ionic groups, and all silicon atoms not connected to silicon or carbon atoms by oxygen bridges are connected to hydrocarbons which may contain some functional groups. The hydrocarbons attached to the silicon should be in a weight ratio to the silicon of 1.5 to 1 and 6 to 1, and preferably below 5.5 to 1, although where other hydrocarbon groups are attached to the siloxane through oxygen linkages, only the total hydrocarbon-silicon ratio need be at least 1.5 to 1. No more than approximately 30 percent of the hydrocarbon groups attached to the silicon atoms should have functional radicals, as for example double bonds, oxirane rings, amine groups, hydroxyl groups, etc.

DESCRIPTION OF THE PREFERRED EMBODIMENTS

Example 1

A size composition of the invention has the following ingredients in percent by weight.

| Ingredients: | Percentages |
|---|---|
| Soluble phenolic-epichlorhydrin reaction product (1) | 2.29 |
| Soluble phenolic-epichlorohydrin reaction product (2) | 0.41 |
| Soluble phenolic epoxide material (3) | 0.81 |
| Acetic acid | 0.30 |
| Gamma methacryloxy propyltrimethoxy silane | 0.10 |
| Methyl phenyl organopolysiloxane (4) 33% water emulsion | 0.30 |
| Polyvinyl acetate | 0.71 |
| Water | Balance |

The numbered materials given above have the following formulae:

(1) 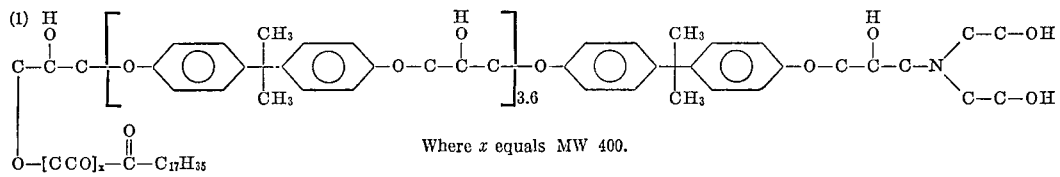

Where x equals MW 400.

(2) Same as 1 except x equals MW 400.

(3) 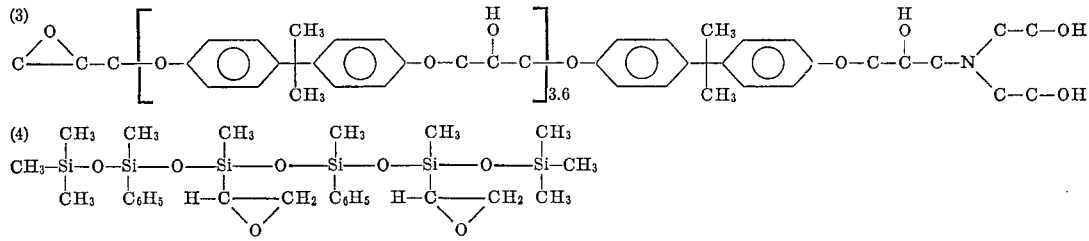

(4) 
$$CH_3-Si(CH_3)-O-Si(CH_3)-O-Si(CH_3)(C_6H_5)-O-Si(CH_3)(H-C-CH_2\text{ epoxide})-O-Si(CH_3)(C_6H_5)-O-Si(CH_3)(H-C-CH_2\text{ epoxide})-O-Si(CH_3)_2-CH_3$$

The above size is prepared by thoroughly mixing the materials designated (1), (2), and (3) ond thereafter acidifying with the acetic acid. This mixture is dissolved by slowly adding cooled deionized water at a temperature of 45 to 65° F. until the inversion point is reached, and thereafter a small amount of additional water is added. This mixture is agitated for ten minutes, and is further diluted. The polyvinylacetate is then added followed by the remainder of the water. The gamma methacryloxy propyltrimethoxy silane is then added to the emulsion, following which the methylphenyl polysiloxane is slowly added and stirred for a minimum of 30 minutes.

The emulsion prepared as given above is applied to two strands each comprising 204 monofilament glass fibers immediately at forming by drawing the fibers over a roll type applicator to which the emulsion is continuously supplied in an amount to completely coat the fibers. The fibers have a diameter of .00037 inch and are drawn over a roller coated with the above emulsion following which they are coiled into a package in the conventional manner. Thirty of the above packages are then brought together into a substantially untwisted sixty end roving, which is again coiled into a package.

The coated fibers made as above described, can be used to reinforce various types of resins, as for example, polyester resins, epoxy resins, polyvinyl acetate resins, polyurethane resins, polyolefin resins, polyacrylates, and other thermosetting resins as for example, phenol formaldehyde resins. In the present instance, the fibers are used to reinforce a polyester resin to produce a light transmitting clear polyester panel. The panel is produced by feeding the 60 end roving into a chopper of conventional design which cuts the roving into approximately one inch lengths following which they are delievered to a hood containing an air jet which directs the fibers at a polyethylene film which covers a moving conveyor belt. Immediately preceding the hood, a uniform depth of an unsaturated polyester resin is applied to the polyethylene film by a knife blade. The chopped roving is allowed to fall upon the layer of unsaturated polyesters resin in a uniform manner following which another polyethylene film is fed to the top of the layer of chopped fibers. The resulting sandwich is then fed between rollers which apply a light pressure thereto to remove air and force the fibers uniformly down into the layer of unsaturated polyester resin. The glass fibers are fed to the resin in an amount to provide a 25 percent by weight glass loaded composite.

The sandwich is thereafter fed beneath a bank of lights which heat the polyester resin to 275° F. for four minutes following which the strip of reinforced polyester resin is cut into six-foot lengths to provide translucent glass fiber reinforced polyester resin panels.

When the above procedure is carried out in an atmosphere having 75 percent relative humidity, a scrap rate of only 1 percent is experienced. By way of contrast, when the above manufacturing operation is carried out in an atmosphere of 75 percent relative humidity using the identical ingredients obove, excepting that the methyl phenyl organopolysiloxane is omitted, a scrap rate of more than approximately 5 percent is obtained because of uneven distribution of the chopped fibers onto the resin. These scrap pieces will have unreinforced areas larger than approximately the size of a one-half dollar. In addition, when the methyl phenyl organopolysiloxane is not used, approximately 2 to 3 percent of the chopped fibers are lost during the chopping operation by reason of an electrostatic charge which causes the fibers to be deposited on the hood and surrounding surfaces rather than being distributed onto the layer of polyester resin. Where the methyl phenyl organopolysiloxane is used, less than 1 percent of the chopped fibers are lost during the chopping and delivery operation to the resin film.

Glass fibers sized as above described using the organosiloxane will have many other uses as for example in the production of glass fiber reinforced plastic pipe and tanks made by the filament winding process. The glass fibers sized as above described wherein the coating contains the organopolysiloxane has noticeably less "fuzzing" of the yarn usually produced by static electricity created as the yarn is drawn over the numerous guide surfaces used in the filament winding process. The yarn remains closely bound together during the filament winding operation to produce a closer lay of the fibers and therefore, a greater and more uniform fiber loading of the resulting product, so that the product has greater strength.

By way of example, dried yarn coated as above described was pulled through a diacetone alcohol solution containing 50 percent epoxy resin and 1.6 percent of meta phenylene diamine curing agent. The resin had the following formula:

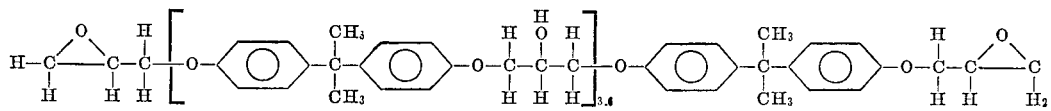

The coated strand was wound upon a mandrel to provide a pipe having an inside diameter of 2 inches and a wall thickness of 0.065 inch. The resulting filament wound material was cured at 275° F. for one hour. The pipe had a fiber loading of 55 percent and withstood 16,000 pressure cycies between 0 and 1,200 p.s.i.

By way of contrast, a pipe prepared similarly excepting that the size did not contain the organopolysiloxane, only withstood 1,000 pressure cycles.

EXAMPLE 2

A size was prepared of the following materials in percent by weight.

Material: Percent
- Glacial acetic acid _____ 0.20
- Gamma aminopropyltriethoxy silane _____ 0.40
- Methyl ethyl organopolysiloxane (5) _____ 0.20
- Isooctyl phenyl polyethoxy ethanol (nonionic wetting agent) _____ 0.20
- Deionized water _____ 99.0

The organopolysiloxane (5) has the following formula:

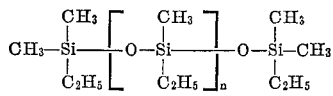

$n$ equals approximately 8.

The size is prepared by adding the acetic acid slowly to three-fourths of the water using violent agitation. Thereafter, the gamma amino propyl trimethoxy silane is added slowly, and mixed for approximately 15 minutes. The methyl ethyl organopolysiloxane is added to a separate mixer along with the isooctyl phenyl polyethoxy ethanol and the balance of the water is slowly blended therewith. After the emulsion inverts, it is mixed for ten minutes following which this emulsion is added to the main mix and the total is then mixed for 15 minutes. The size as above constituted is supplied to a conventional applicator and a strand of 2,040 glass fibers of 0.0003 inch diameter are pulled over the applicator and coated at a rate of approximately 4,000 feet per minute, following which the coated strand is wound into a coiled package. The coiled package is dried, and this srand is filament wound into pipe by drawing through the epoxy resin according to the procedure described above. The filament wound material when cured as above described provided a pipe of 2 inches OD and 0.065 inch wall thickness and withstood 20,000 pressure cycles between 0 and 1200 p.s.i.

By way of comparison, the same type of glass fibers when coated with the identical size material excepting that the organosiloxane is omitted, produced a filament wound pipe having a wall thickness of 0.105 inch, and only withstood 1,000 pressure cycles.

The following is a list of materials which can be substituted for the methyl ethyl polysiloxane of Example 2 to produce antistat properties in polyester resins and epoxy resins.

(A) 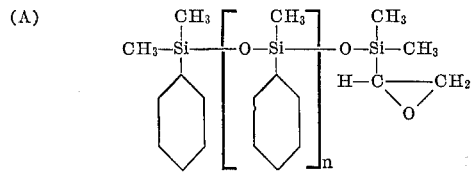

33 percent solids in emulsion and $n$ equals approximately 3.

(B) 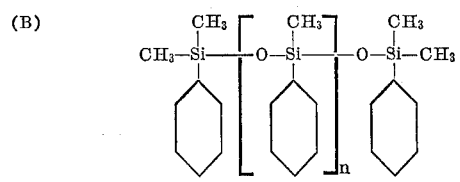

33 percent solids in emulsion and $n$ equals approximately 3.

(C) 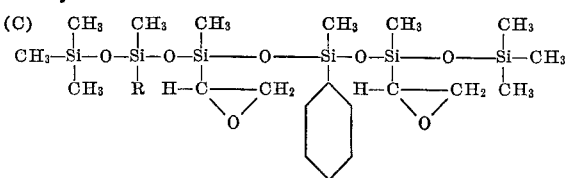

(D) 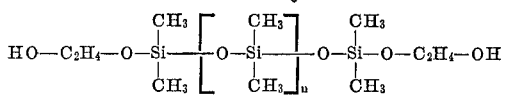

when made a copolymer.

(E) 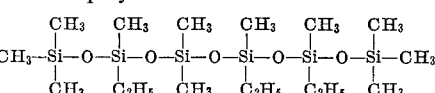

(F) 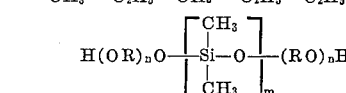

(G) 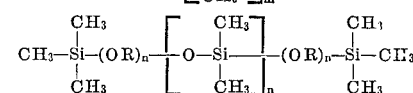

(H) 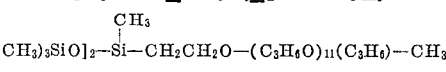

(I) 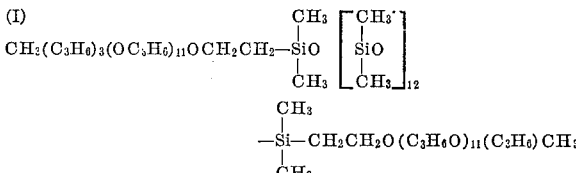

(J) 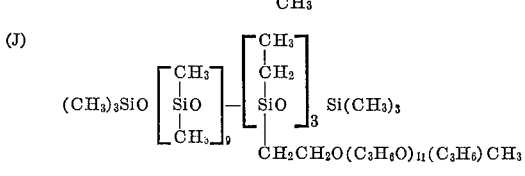

(K) 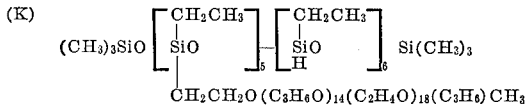

(L) 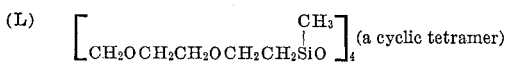

(M) 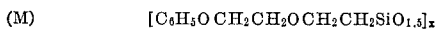

(N) 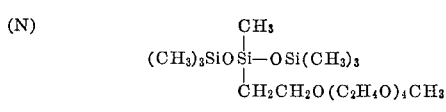

(O) 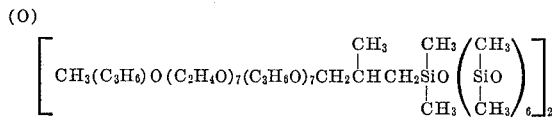

(P) 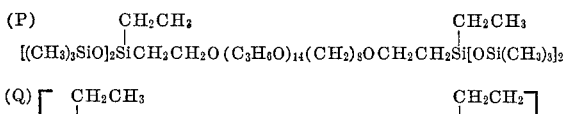

(Q) 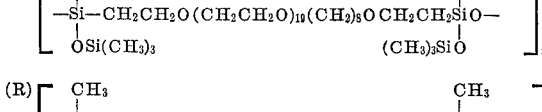

(R) 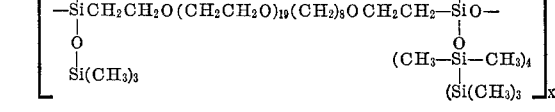

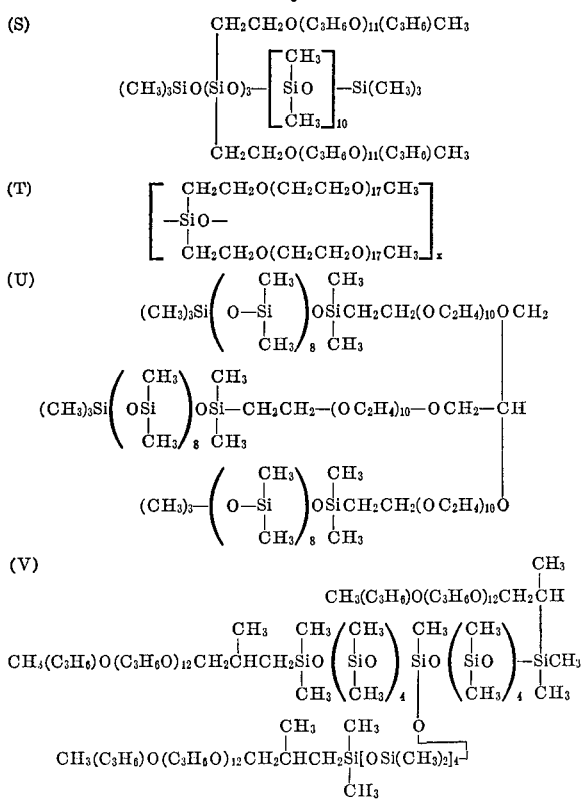

(W) Iodopropyltrimethoxy silane
(X) Phosphate propyltrimethoxy silane

Since the iodopropyltrimethoxy silane is used in a water emulsion, the iodine on the compound is replaced by an OH group and is believed deposited in the film in this form.

It is obvious that the organosiloxanes of the present invention can be used with substantially any resin material having a high percent of hydrocarbons therein to produce films having good antistat properties. These films can be predominantly polyester resins, epoxy resins, polyvinyl acetate resins, acrylic resins, polyolefin resins, and thermosetting resins such as polyurethanes, phenol aldehyde resins, ureaformaldehyde resins, etc.

In some instances, it is desirable to copolymerize the siloxane with a film forming resin to completely immobilize the siloxane.

EXAMPLE 3

A siloxane alkyd copolymer is produced by heating the following materials to 180° C. for one half hour and then raising the temperature slowly to 230° C. and holding at this temperature for 3½ hours.

| Materials: | Percent by wt. |
|---|---|
| Organosiloxane [1] | 25 |
| Maleic acid | 23 |
| Phthalic anhydride | 18 |
| Diethylene glycol | 34 |

[1] See the following table:

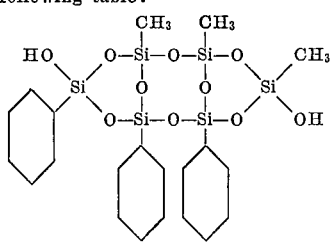

The above materials are thinned with 10 percent xylene and completely mixed before being cooked. The material upon cooling to room temperature had a viscosity of 17.6 centistokes. The reaction product is then diluted to an 85 percent solution using a 50:50 mixture of xylenol and normal butanol. The copolymer produced as above described is a silalkyd copolymer and an emulsion of this copolymer is prepared using the following materials.

| Material: | Percent by wt. |
|---|---|
| Silalkyd resin given above (solids) | 20 |
| Gamma amino propyl triethoxy silane | 1 |
| Emulsifier (nonyl phenyl polyethoxy ethanol) | 2.4 |
| Water | 78.6 |

This emulsion is prepared by adding the surfactant to the copolymer, following which this mixture is added to water at a temperature of approximately 65° F. The gamma amino propyl trimethoxy silane and acetic acid is then added and thoroughly mixed to provide an emulsion for application to the fibers. Glass fibers are coated with this material in the same manner as given in Example 1 and panels produced in a room having a 75 percent relative humidity had less than 1 percent of scrap due to poor distribution of the fibers.

The cooking procedure used in Example 3 is essentially a one step process wherein the polyester resin is formed at the same time that it is being cooked with the siloxane. The silalkyd copolymer can also be produced in a two step process wherein the polyester prepolymer is first formed by reacting the glycol and acid anhydride together, following which this alkyd resin is reacted with a siloxane having hydroxyl groups thereon. These hydroxyl groups can be attached directly to the silane where they are in the nature of an ionic material, or they can be on glycol groups attached to the silane.

EXAMPLE 4

A commercial alkyd resin purchased from the Kopper's Company under the trade name Rezyl 310-5 is reacted with the siloxane given in Example 3 in the ratio of 75 parts of the polyester to 25 parts of the siloxane. The reaction is carried out at 140° C. under refluxing conditions for approximately five hours. The Rezyl polymer is a reaction product of 34 parts by weight of hydroxylated soya oil and 41 parts by weight of phthalic anhydride cooked to an acid number of from 4 to 10. The finished material contains 25 percent by weight of a xylenol diluent.

When this material is incorporated into a size in the same manner as given in Example 3 and similarly applied to glass fibers, they likewise can be used to produce reinforced polyester panels with substantially no loss of the finished product due to nonuniform distribution of the glass fibers onto the impregnating resin.

Any type of siloxane having two hydroxyl groups thereon can be used to form a silalkyd copolymer using the procedure described in either Examples 3 or 4. By way of example, suitable silalkyd copolymers are prepared using the materials D and F given above when substituted for the siloxane of Example 3 and cooked in the same manner as given in Example 3.

EXAMPLE 5

A size composition having the following ingredients in percent by weight was prepared.

| Ingredients: | Percentages |
|---|---|
| Soluble phenolic-epichlorhydrin reaction product (1 of Example 1) | 2.34 |
| Soluble phenolic-epoxide material (3 of Example 1) | 0.66 |
| Polyvinyl actate | 2.73 |
| Glacial acetic acid | 0.30 |
| Gamma methacryloxy propyltrimethoxy silane | 0.35 |
| Methyl phenyl organopolysiloxane (4 of Example 1) 33 percent water emulsion | 0.50 |
| Baymal | 0.15 |
| Water | Balance |

An emulsion of the above material is made generally in the same manner as given for that of Example 1 above, excepting that a water dispersion of the Baymal is first made, and this dispersion is added to an emulsion of the other materials.

Fibers coated with this material can be chopped and added to resin in the panel forming process described in Example 1 with the same general lack of static generating properties as do the fibers of Example 1. The fibers, however, become wetted out by the resin more quickly than do the fibers of Example 1.

While the invention has been described in considerable detail, we do not wish to be limited to the particular embodiments shown or described, and it is our intention to cover hereby all novel adaptations, modifications, and arrangements thereof which come within the practice of those skilled in the art to which the invention relates and which come within the purview of the following claims.

What is claimed is:

1. A reinforced plastic article comprising glass fibers having a coating thereon consisting esentially of a mixture of: emulsion particles of an organosiloxane devoid of ionic groups and the silicon atoms of which are connected to atoms from the group consisting of oxygen bridges and carbon, and wherein the hydrocarbon groups to silicon weight ratio is between 1.5 and 6; and from 0 to approximately 1,000 times the weight of said organosiloxane of emulsion particles of an organic film former that is compatible with said organosiloxane; said emulsion particles being dispersed throughout a liquid containing a coupling agent from the group consisting of a metal oxide, a Werner complex and an organosilane; said coated fibers being surrounded by and acting as a reinforcing for a polyester matrix resin.

2. The article of claim 1 wherein the coupling agent is an organosilane.

3. The article of claim 1 wherein the hydrocarbons directly attached to the silicon atoms of the organosiloxane are in a weight ratio of between 1.5 and 5.5.

4. The article of claim 1 wherein no more than 30 percent of the organo groups attached to the silicon atoms of the organosiloxane have functional radicals.

5. The article of claim 1 wherein the siloxane is a methyl phenyl siloxane and is present with the film former as an admixture.

6. A translucent polyester panel reinforced by chopped glass fibers having a coating thereon of: emulsion particles of an organosiloxane devoid of ionic groups and the silicon atoms of which are connected to atoms from the group consisting of oxygen bridges and carbon, and wherein the hydrocarbon groups to silicon weight ratio is between 1.5 and 6; and from 0 to approximately 1,000 times the weight of said organosiloxane of emulsion particles of an organic film former that is compatible with said organosiloxane; said emulsion particles being dispersed throughout a liquid containing a coupling agent from the group consisting of a metal oxide, a Werner complex and an organosilane.

References Cited
UNITED STATES PATENTS

| | | | |
|---|---|---|---|
| 2,673,823 | 3/1954 | Biefeld et al. | 117—126X |
| 2,731,367 | 1/1956 | Caroselli | 117—126 |
| 3,193,429 | 7/1965 | Yaeger | 117—126X |
| 3,316,337 | 4/1967 | North | 117—126X |

WILLIAM D. MARTIN, Primary Examiner

D. COHEN, Assistant Examiner

U.S. Cl. X.R.

117—126; 161—170